(12) United States Patent
Radinger et al.

(10) Patent No.: US 8,950,289 B2
(45) Date of Patent: Feb. 10, 2015

(54) CONTROLLED AXIAL BIASING UNIT

(75) Inventors: Norbert Radinger, Nuremberg (DE); Tomas Smetana, Herzogenaurach (DE); Fritz Wiesinger, Kammerstein (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 705 days.

(21) Appl. No.: 13/256,368

(22) PCT Filed: Feb. 19, 2010

(86) PCT No.: PCT/EP2010/052124
§ 371 (c)(1),
(2), (4) Date: Sep. 13, 2011

(87) PCT Pub. No.: WO2010/102893
PCT Pub. Date: Sep. 16, 2010

(65) Prior Publication Data
US 2012/0006150 A1    Jan. 12, 2012

(30) Foreign Application Priority Data

Mar. 13, 2009 (DE) .......................... 10 2009 013 121

(51) Int. Cl.
*F16H 48/20* (2012.01)
*F16D 23/12* (2006.01)
*F16H 53/00* (2006.01)
*F16H 25/18* (2006.01)

(52) U.S. Cl.
CPC .............. *F16D 23/12* (2013.01); *F16H 25/186* (2013.01); *F16D 2023/123* (2013.01)

USPC ............................................ 74/567; 475/231

(58) Field of Classification Search
USPC ........ 74/56, 57, 333, 340, 567; 192/93 A, 20, 192/84.6; 475/231, 150, 293
See application file for complete search history.

(56) References Cited

U.S. PATENT DOCUMENTS

| 3,163,478 | A |   | 12/1964 | Pitner |        |
|-----------|---|---|---------|--------|--------|
| 5,080,640 | A | * | 1/1992  | Botterill | 475/231 |
| 5,106,349 | A |   | 4/1992  | Botterill et al. |  |
| 7,083,033 | B2| * | 8/2006  | Yamazaki | 192/84.6 |
| 7,252,017 | B2|   | 8/2007  | Kramer |        |
| 7,806,797 | B2|   | 10/2010 | Gassmann et al. |  |

FOREIGN PATENT DOCUMENTS

| DE | 103 21 659 A1 | 11/2004 |
| DE | 103 48 312 A1 | 5/2005  |
| DE | 102 62 144 B4 | 4/2007  |

(Continued)

*Primary Examiner* — Thomas Diaz
(74) *Attorney, Agent, or Firm* — Volpe and Koenig, P.C.

(57) ABSTRACT

A controlled axial biasing unit (1) is provided which substantially includes a first ramp disk (11) and a second ramp disk (12), each of which disks is configured with a plurality of ramp contours (8). An annular cage (2) that carries a plurality of rolling elements (3) is inserted between the first ramp disk (11) and the second ramp disk (12). At least the first ramp disk (11), the second ramp disk (12) and the cage (2) are made by a shaping method without chip removal. Each of the first ramp disk (11) and the second ramp disk (12) is configured with a continuous wall (32). Likewise through this shaping method, the first ramp disk (11) and the second ramp disk (12) have on an outer periphery ($U_A$) an integrally formed safety stop device (14) for respective end positions.

15 Claims, 10 Drawing Sheets

(56) References Cited

FOREIGN PATENT DOCUMENTS

| | | |
|---|---|---|
| DE | 10 2005 053 555 B3 | 8/2007 |
| DE | 10 2007 004 712 A1 | 8/2008 |
| FR | 2 647 174 | 11/1990 |
| WO | 2009068403 A1 | 6/2009 |
| WO | 2010000674 A1 | 1/2010 |

* cited by examiner

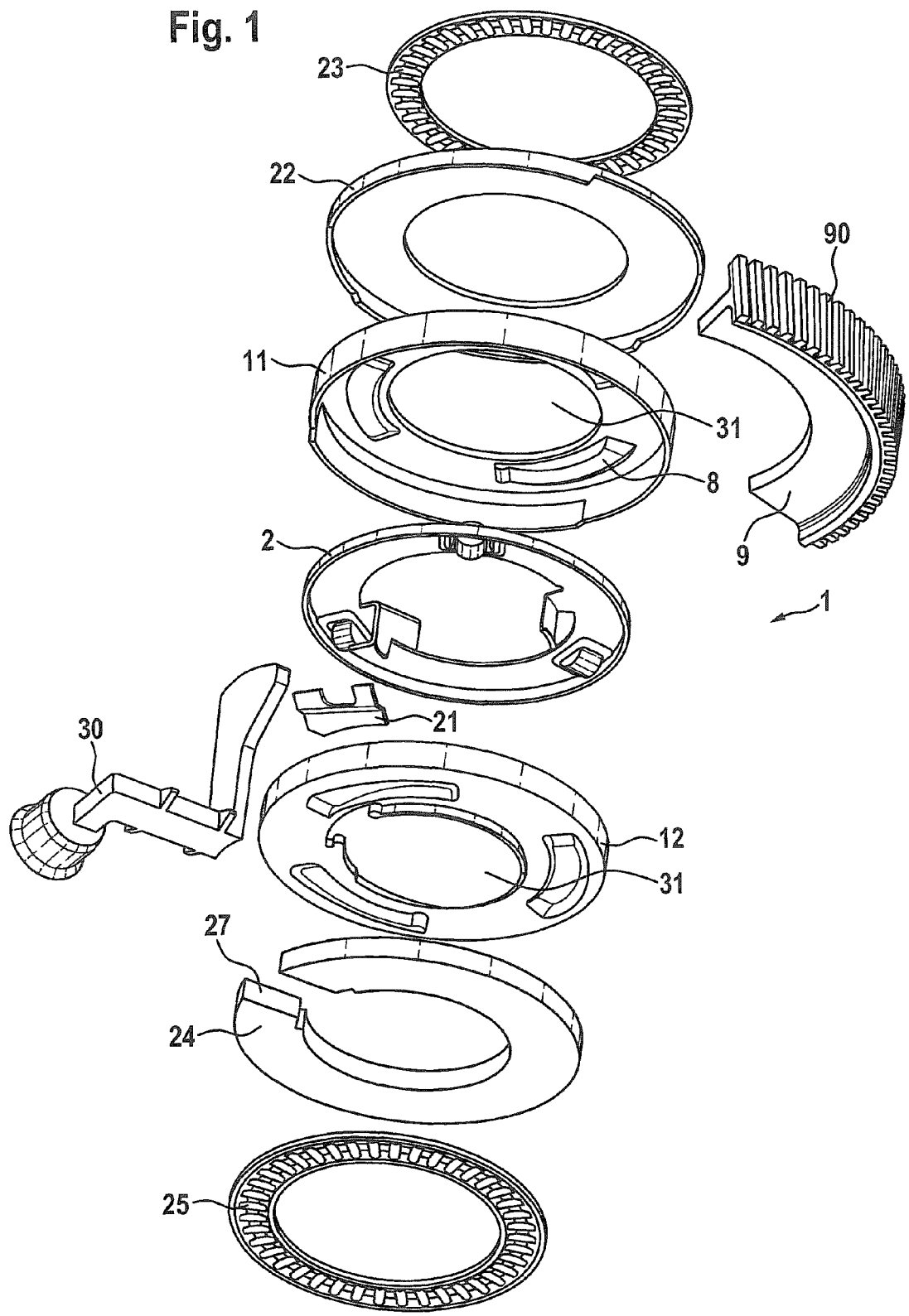

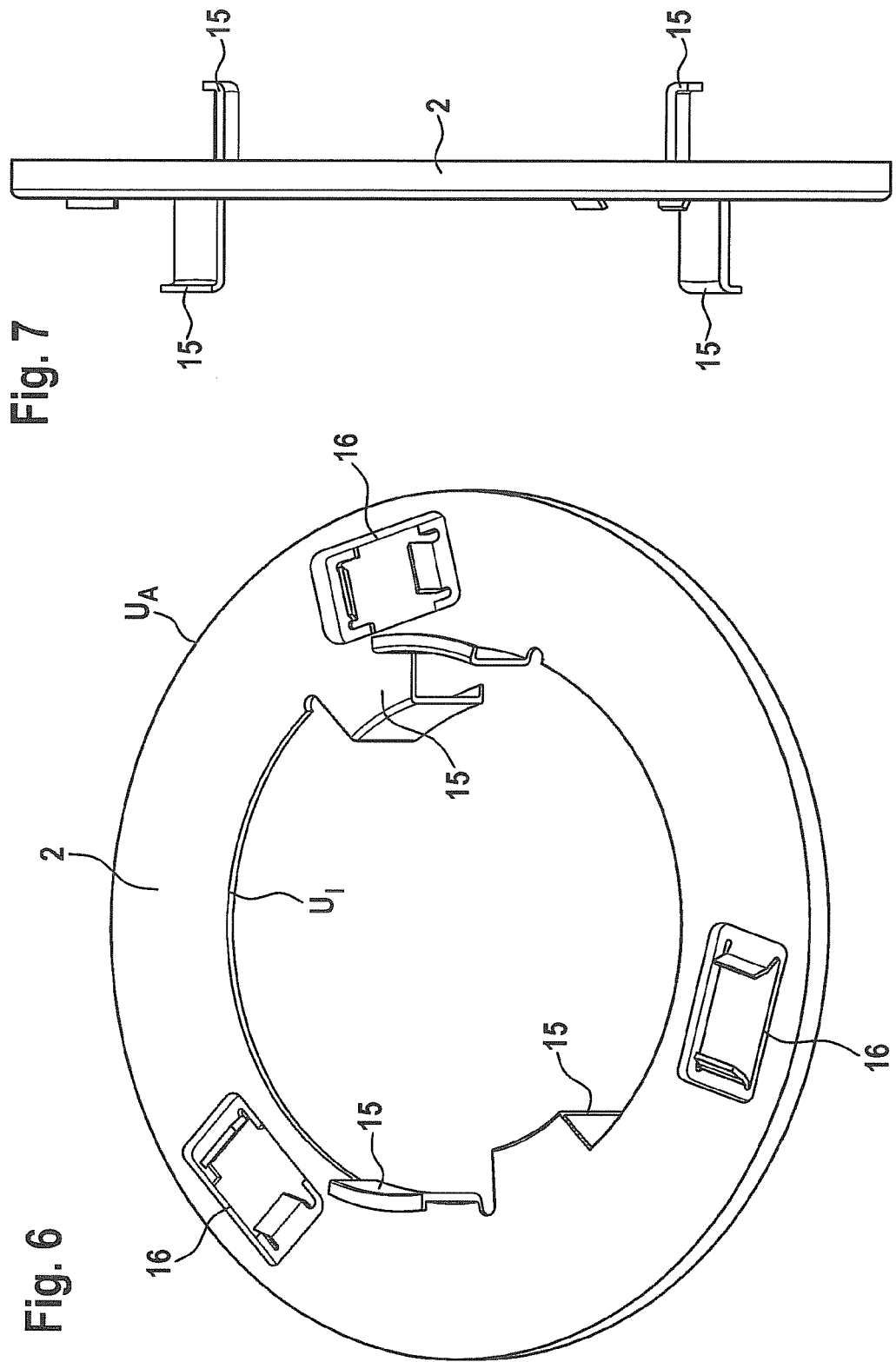

CONTROLLED AXIAL BIASING UNIT

BACKGROUND

The invention concerns a regulated axial biasing unit. This biasing unit comprises a first ramp disk and a second ramp disk, a plurality of ramp contours being configured on said first and second ramp disks. The biasing unit further comprises an annular cage carrying a plurality of rolling elements and inserted between the first ramp disk and the second ramp disk. One of the two ramp disks comprises a toothed segment. Accordingly, the other of the two ramp disks comprises an anti-rotation device.

Biasing units of the aforesaid type are used in transmissions of automotive vehicles, particularly to enable the actuation of a friction clutch in the drive train of an automotive vehicle.

German patent specification DE 10 2005 053 555 B3 discloses am axial adjusting device in form of a ball-and-ramp arrangement. The axial adjusting device comprises two disks centered on a common axle, one of the disks being axially supported and the other disk being slidingly displaceable, at least one of these disks being rotatably operable. The two disks comprise on their mutually facing front end surfaces, a same number of ball grooves extending in peripheral direction. Both disks are therefore mounted through rolling elements in form of balls.

U.S. Pat. No. 5,485,904 likewise discloses a biasing unit whose ramp disks can be rotated relative to each other by means of rolling elements in form of balls.

Similarly, U.S. Pat. No. 5,620,072 also discloses a biasing unit for a multi-disk clutch whose ramp disks are likewise rotatable relative to each other through rolling elements in form of balls.

German patent specification DE 10 2004 015 271 B4 discloses a torque transmission device. In this case, the rolling elements and the thrust bearing are arranged on a pitch circle of the same diameter. Balls are used as rolling elements.

The unpublished German patent applications based on invention reports E 2007 676 and E 2008 015 describe the mode of functioning of an axial biasing unit. Here, a biasing unit comprises a cage for rolling elements which is configured with pockets corresponding in number to the rolling elements to be retained. Each of the rolling elements is in contact with a ramp contour in the first ramp disk and with a ramp contour in the second ramp disk. When at least one of the two ramp disks is turned relative to the other ramp disk, the rolling elements ascend and/or descend along the ramp contours. The pockets for the rolling elements are configured such that, irrespective of the position of the rolling elements relative to the ramp contour, the pockets do not make any contact with the respective ramp contour.

The biasing units described above are uncontrolled biasing units comprising balls or rollers. The axial force of such biasing units depends on the torque take-up and cannot be actively controlled. The uncontrolled biasing units are used, for example, in optional all-wheel drive systems. In contrast, in differential gears with torque vectoring and in certain power take-off gears, the torque between the wheels or between the front and the rear axle is purposefully and actively controlled. In this case, one of the ramp disks comprises an outer gearing which is actuated through one or more cylinder gear steps or a worm gear by an electro motor.

Analogously, for an optional all-wheel drive, the ramp disks including the gearing are manufactured as solid parts. Feasible manufacturing methods are sintering, casting or forging. The biasing clutch is made up of a plurality of separate parts which, in the final analysis makes assembly and handling more difficult.

SUMMARY

The object of the invention is to provide a controlled axial biasing unit with which costs can be reduced and the weight of the axial biasing unit as well as its design space requirement are likewise reduced and both handling and assembly of the axial biasing unit are considerably simplified.

The invention achieves the above object through a controlled axial biasing unit including the features of the invention.

The controlled axial biasing unit according to the invention includes a first ramp disk and a second ramp disk each of which is configured with a plurality of ramp contours. The biasing unit further comprises an annular cage carrying a plurality rolling elements and inserted between the first ramp disk and the second ramp disk. One of the two ramp disks comprises a toothed segment. The other of the two ramp disks comprises an anti-rotation device. At least the first ramp disk, the second ramp disk and the cage are made by a shaping method without chip removal. Each of the first ramp disk and the second ramp disk is configured with a continuous wall. Each of the first ramp disk and the second ramp disk comprises integrally formed on an outer periphery, a stop device for an end position.

The annular cage comprises pockets corresponding in number to the number of rolling elements to be retained. On the inner diameter of the annular cage is formed a plurality of retaining lugs that project perpendicularly on both sides from the annular cage.

The anti-rotation device is welded onto the one of the two ramp disks to connect this ramp disk to a housing of the transmission. The other of the two ramp disk comprises a toothed segment that is shaped out of sheet metal that is configured with a rolled-in gearing. The toothed segment is welded onto the first ramp disk and the rolled-in gearing is a helical gearing. The terms first and second ramp disk and the one and the other ramp disk are not to be interpreted as a limitation of the invention but serve rather only the purpose of describing the invention and the associated drawings.

The ramp contours configured in the two ramp disks have the shape of a simple ramp. The ramp contour forms an angle of smaller than or equal to 5°.

The first ramp disk comprises a spacer that is adjoined by a thrust needle roller bearing. The second ramp disk likewise comprises a spacer that is adjoined by another thrust needle roller bearing. The other spacer that is consecutive to the second ramp disk has a C-shaped configuration. An oil flow guide is fitted into the empty space formed by the C-shaped configuration, the width of the oil flow guide corresponding to the width of the spacer.

The first ramp disk and the second ramp disk have a pot-shaped configuration and each of them possesses a central opening and a wall that is formed on the outer periphery of the first ramp disk and the second ramp disk. The first ramp disk has a somewhat larger outer diameter than the second ramp disk, so that the pot-shaped second ramp disk engages partially into the pot-shaped first ramp disk. The retaining lugs of the cage engage on the inner diameter of the opening of the first ramp disk and of the second ramp disk. In this way, the first ramp disk and second ramp disk are retained together.

The cage that retains the first ramp disk and the second ramp disk together, the spacer that adjoins the first ramp disk, the spacer that adjoins the second ramp disk together with the respective thrust needle roller bearings and in conjunction with the anti-rotation device, the toothed segment and the oil flow guide constitute a pre-assembled unit. The spacer associated to the first ramp disk has a pot-shaped configuration. In the installed state, the pre-assembled unit is guided in the transmission casing through an outer diameter of the pot-shaped spacer.

BRIEF DESCRIPTION OF THE DRAWINGS

Examples of embodiment described in the following with reference to the appended drawings will elucidate the invention and its advantages in more close detail.

FIG. 1 shows an exploded illustration of the biasing unit according to the invention.

FIG. 6 shows a perspective view of the cage that retains the first ramp disk and the second ramp disk together.

FIG. 7 shows a side view of the cage.

DETAILED DESCRIPTION OF THE PREFERRED EMBODIMENTS

Figure 3:
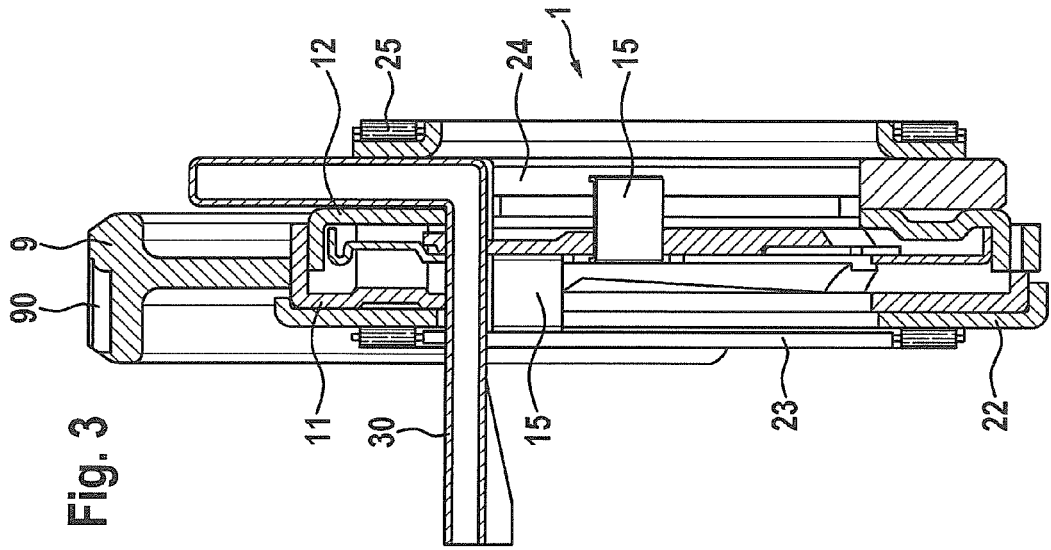
FIG. 3 shows a sectional view through the controlled axial biasing unit.

Identical reference numerals are used for identical or identically acting elements of the invention. Further, for the sake of more clearness, only those reference numerals appear in the individual figures that are relevant to the description of the figure concerned. The forms of embodiment illustrated are merely examples of how the device of the invention can be configured and therefore do not constitute any definite limitation of the invention.

FIG. 1 shows a perspective exploded illustration of the axial biasing unit 1. A cage 2 is inserted between a first ramp disk 11 and a second ramp disk 12. This cage 2 carries a plurality of rolling elements 3 that ascend and/or descend along ramps 8 that are configured on the inner surface of the first ramp disk 11 and the second ramp disk 12. Each of the first ramp disk 11 and the second ramp disk 12 has a pot-shaped configuration. Both disks possess a central opening 31 and a wall 32.

The first ramp disk 11 comprises a toothed segment 9. The toothed segment 9 can be connected to the first ramp disk 11 by a weld joint. The toothed segment 9 is made by shaping out of a sheet metal. A gearing 90 is rolled into the toothed segment 9. Further, the second ramp disk comprises an anti-rotation device 21. This anti-rotation device is likewise welded to the second ramp disk 12. Thus, through the anti-rotation device a firm connection is formed between the second ramp disk 12 and the casing 70 of the transmission 71.

The first ramp disk 11 is adjoined by a spacer 22 comprising a thrust needle roller bearing 23 on the outside. In the same way, a spacer 24 adjoins the second ramp disk 12 and likewise comprises a thrust needle roller bearing 25. The spacer 24 adjoining the second ramp disk 12 has a C-shaped configuration. An oil flow guide 30 can be fitted into the empty space 27. The width of the oil flow guide 30 corresponds to the width of the spacer 24.

Figure 2:
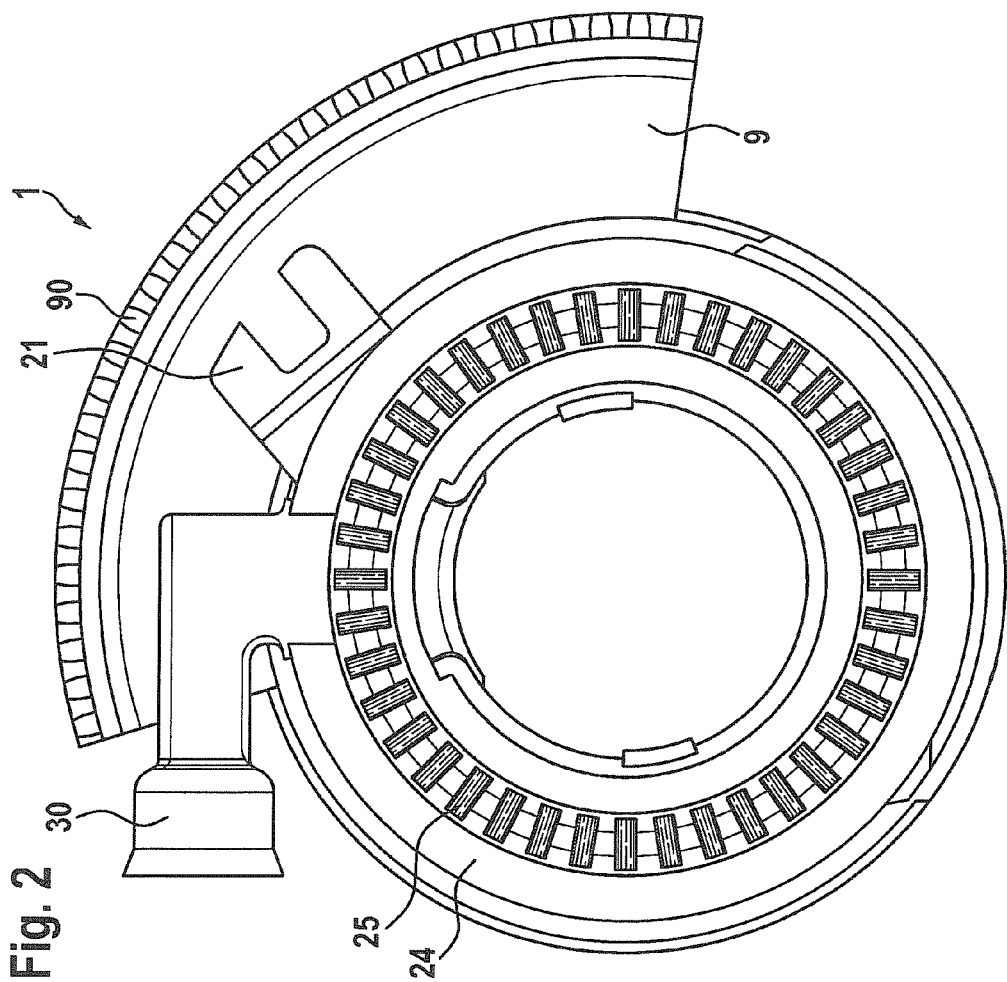
FIG. 2 shows a side view of the controlled axial biasing unit which is a pre-assembled unit for installation in a transmission.

FIG. 2 shows a top view of the assembled controlled axial biasing unit 1. The toothed segment 9, which is not in operation in this view, is in a position in which the anti-rotation device 21 is situated directly in front of the toothed segment 9. The oil flow guide 30 is inserted through the spacer 24 and covered by the thrust needle roller bearing 25.

FIG. 3 shows a sectional view through the assembled controlled axial biasing unit 1. The controlled axial biasing unit 1 substantially comprises the first ramp disk 11 and second ramp disk 12 both of which are retained together by the cage 2. For retaining the first ramp disk 11 and the second ramp disk 12 together, appropriate retaining lugs 15 are configured on the cage 2. In the illustration shown in FIG. 3, it can be seen that the toothed segment 9 is connected to the wall 32 of the first ramp disk 11. The first ramp disk 11 is adjoined by a spacer 22 which, in turn, is adjoined by a thrust needle roller bearing 23. In a corresponding manner, the second ramp disk 12 is adjoined by a spacer 24 that likewise comprises on the outside a thrust needle roller bearing 25. The oil flow guide 30 is inserted through the spacer 24 and thus extends through the openings configured in the first ramp disk 11 and in the second ramp disk 12.

Figure 4:
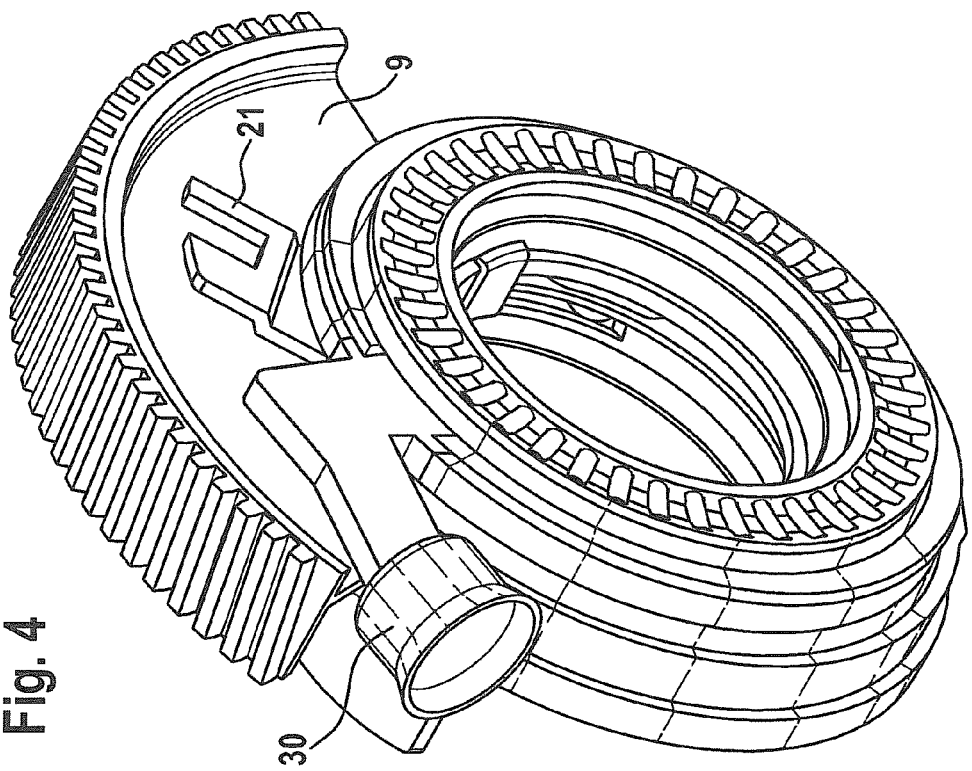
FIG. 4 shows a perspective view of the controlled axial biasing unit in the non-operating state.

FIG. 4 shows a perspective view of the axial biasing unit that can be assembled and installed in this way. In the illustration shown in FIG. 4, the toothed segment 9 is not in operation. As a result, the anti-rotation device 21 is situated directly in front of the toothed segment 9. The oil flow guide 30 likewise adjoins the front end of the toothed segment 9.

Figure 5:
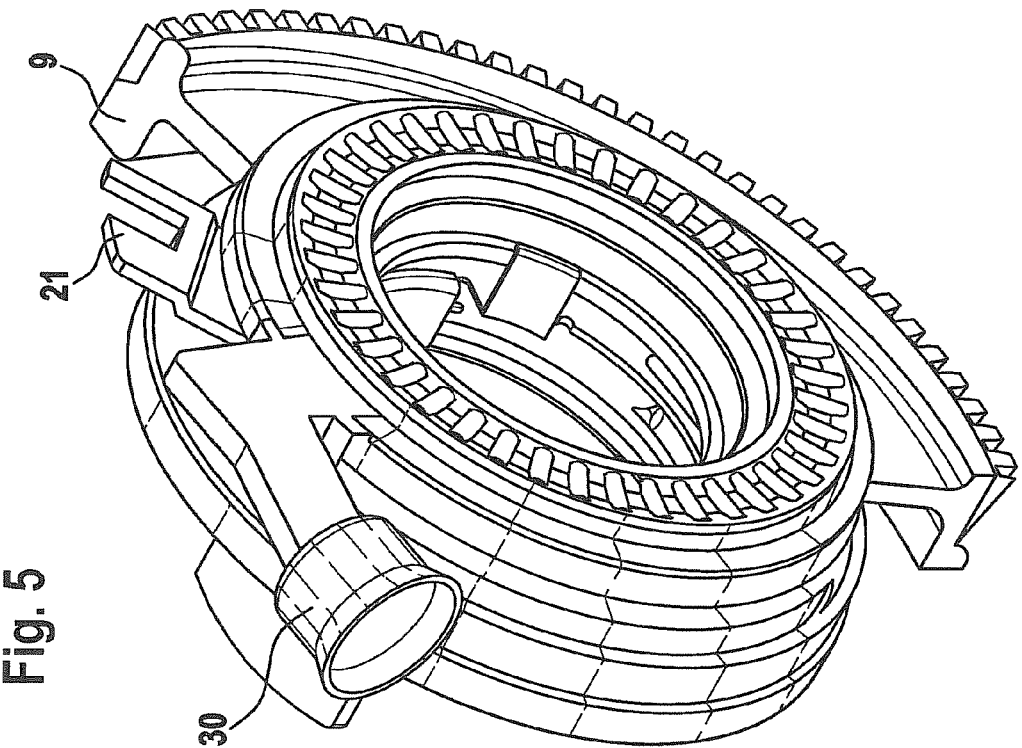
FIG. 5 shows a perspective view of the controlled axial biasing unit in the operating state.

FIG. 5 shows a perspective view of the axial biasing unit in which the toothed segment 9 is in operation. The actuation of the toothed segment 9 causes a rotation of the first ramp disk 11 relative to the second ramp disk 12. The second ramp disk 12 cannot rotate because it is connected through the anti-rotation device 21 to the casing 70 of the transmission 71.

FIG. 6 shows a perspective view of the cage 2 that is arranged between the first ramp disk 11 and the second ramp disk 12. One function of the cage 2 is to retain the rolling elements 3 in the pockets 16 provided for this purpose. A further function of the cage 2 is to connect the first ramp disk 11 and the second ramp disk 12 to each other and retain them together. For this purpose, the cage 2 is configured with a plurality of retaining lugs 15 on the inner periphery $U_I$.

FIG. 7 shows a side view of the cage 2. This illustration clearly shows that the retaining lugs 15 protrude perpendicularly from the cage 2.

Figure 8:
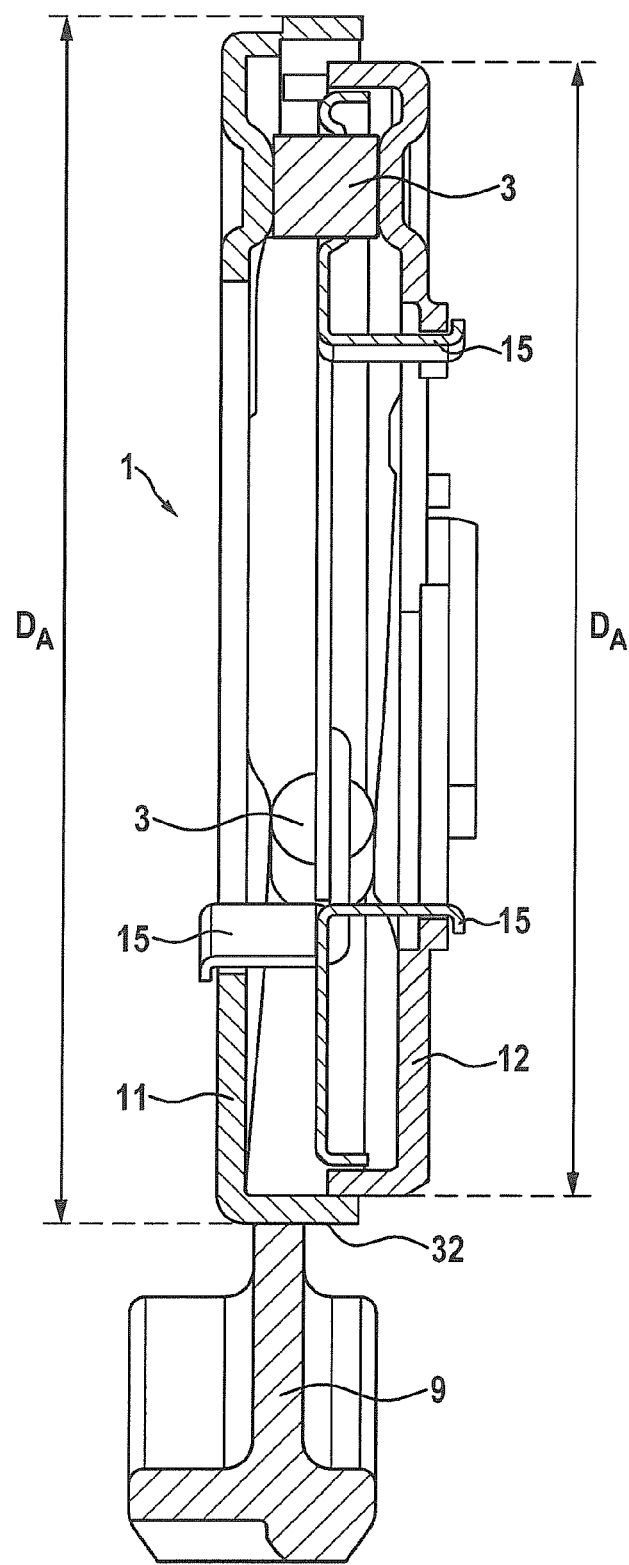
FIG. 8 shows a sectional view through the axial biasing unit in which only the first ramp disk and second ramp disk are mounted.

FIG. 8 shows a side view of a partially assembled axial biasing unit 1. In the illustration of this figure, the first ramp disk 11 and the second ramp disk 12 are joined to each other and retained together by the cage 2. As already mentioned above, the first ramp disk 11 and the second ramp disk 12 have a pot-shaped configuration. The first ramp disk 11 possesses a larger outer diameter $D_A$ than the second ramp disk 12.

Between the first ramp disk 11 and the second ramp disk 12 is arranged the cage 2 that carries a plurality of rolling elements 3. These rolling elements 3 cooperate with the ramps 8 that are configured in the first ramp disk 11 and the second ramp disk 12. The contours of the ramps 8 include a hollow space in an area opposite an axially protruding surface of the ramp contours of each of the first and second ramp disks, as seen in FIG. 8. It can likewise be clearly seen from FIG. 8 how the retaining lugs 15 of the cage 2 cooperate with the first ramp disk 11 and the second ramp disk 12 and thus retain these together. The first ramp disk 11 and the second ramp disk 12 are assembled such that the second ramp disk 12 is at least partially received by the pot-shaped first ramp disk 11. The toothed segment 9 is configured on the wall 32 of the first ramp disk 11. As a rule, this toothed segment 9 is welded to the wall 32 of the first ramp disk 11. The first ramp disk 11, the second ramp disk 12 and the cage 2 are made by a shaping method without chip removal.

Figure 9:
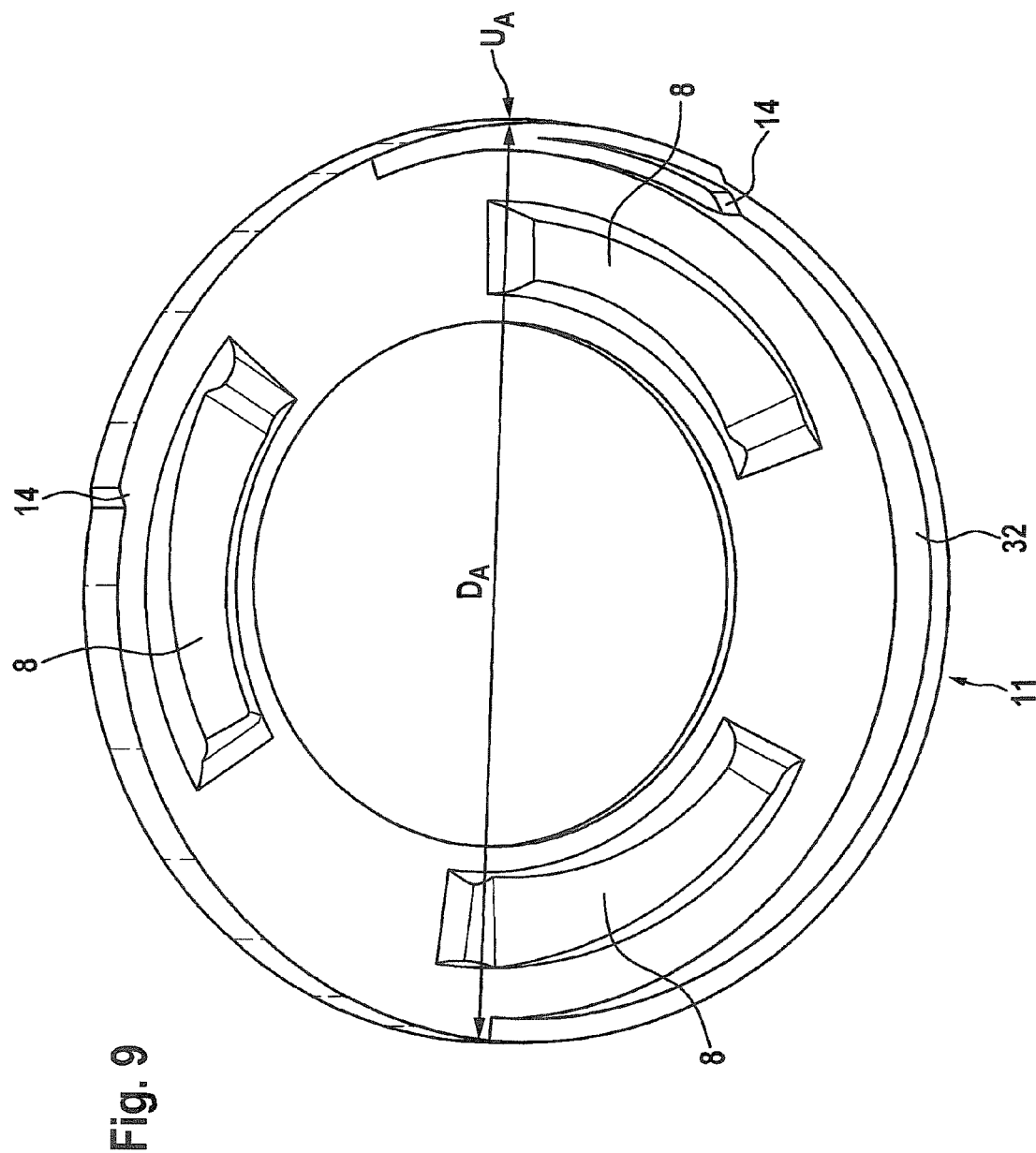
FIG. 9 shows a top view of one of the ramp disks.

FIG. 9 shows a view of the first ramp disk 11. Each of the first ramp disk 11 and the second ramp disk 12 comprises configured on the outer periphery $U_A$, a continuous wall 32. At least one safety stop device 14 is configured at certain points of the outer periphery $U_A$, of the first ramp disk 11. This safety stop device makes it possible to achieve a limitation of the relative rotation between the first ramp disk 11 and the second ramp disk 12. The walls of the first ramp disk 11 and the second ramp disk 12 thus form plain bearings for supporting radial forces from the worm drive (not illustrated). The worm drive cooperates with the toothed segment 9 for implementing a relative rotation between the first ramp disk 11 and the second ramp disk 12. The corresponding ramp contours 8 in the first ramp disk 11 and the second ramp disk 12 are likewise configured through the shaping method without chip removal.

Figure 10:
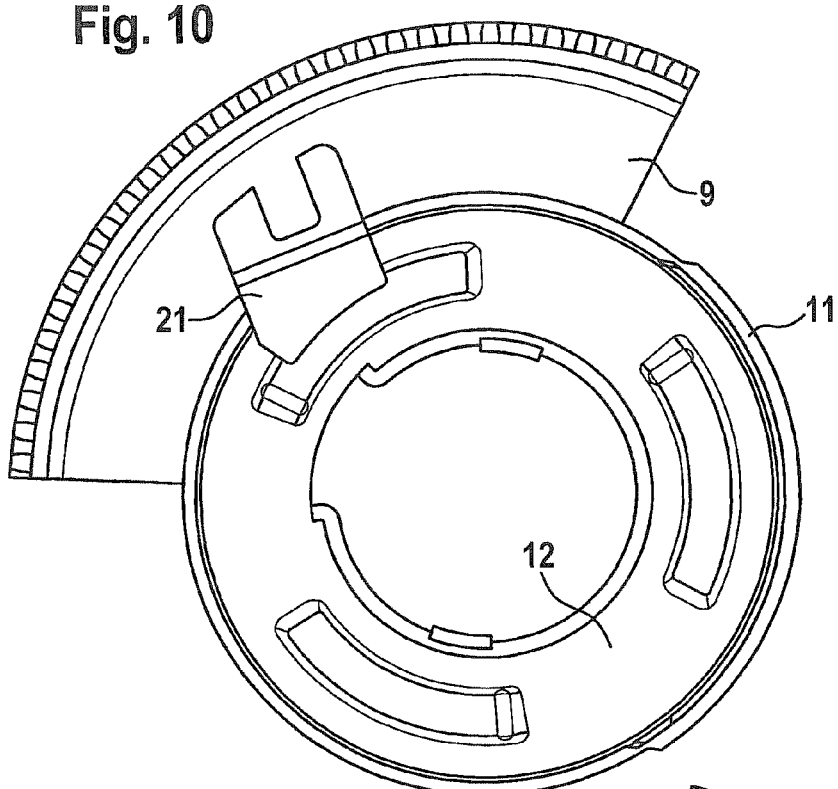
FIG. 10 shows a top view of the controlled axial biasing unit in which only the first ramp disk and second ramp disk are mounted, and the toothed segment is not in operation.

FIG. 10 shows a side view of the axial biasing unit 1 comprising only the first ramp disk 11 and the second ramp disk 12 which are retained together through the cage 2. In addition, as already frequently mentioned, the toothed segment 9 is connected to the first ramp disk 11 and the anti-rotation device 21 is connected to the second ramp disk 12.

Figure 11:
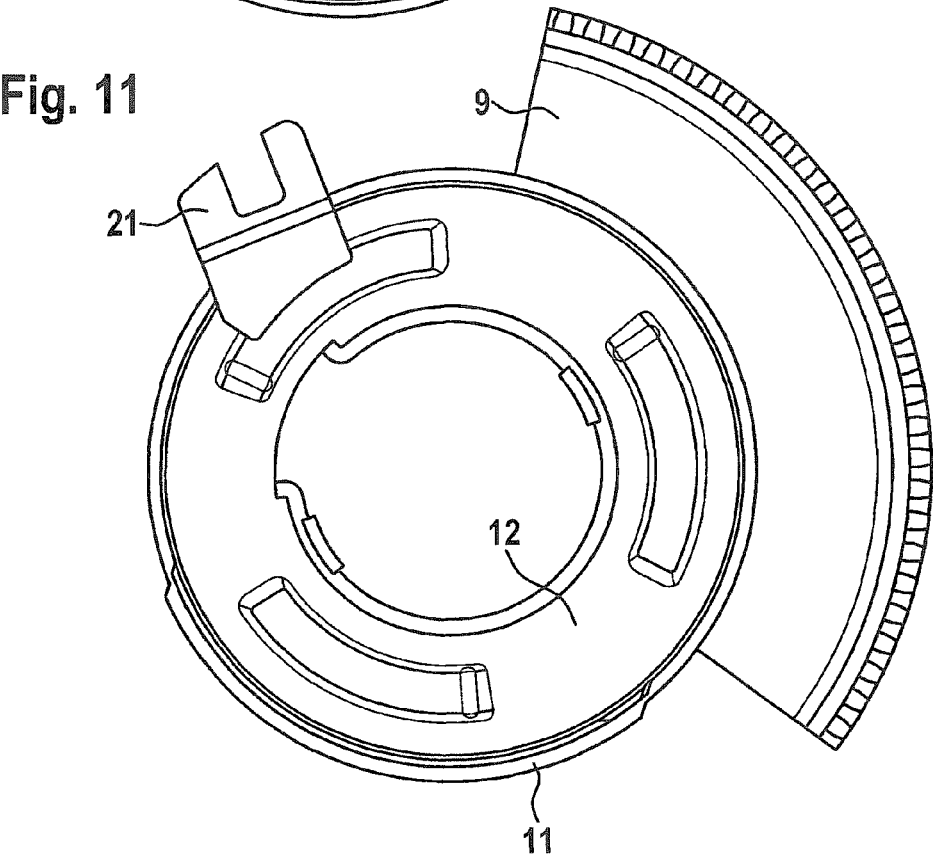
FIG. 11 shows the view of FIG. 10, with the toothed segment in operation.

In the illustration of FIG. 11, the toothed segment 9 is in operation. The figure clearly shows that the second ramp disk 12 has not moved from the position shown in FIG. 10. This is achieved by the fact that the anti-rotation device 21 prevents the second ramp disk 12 from rotating.

Figure 12:
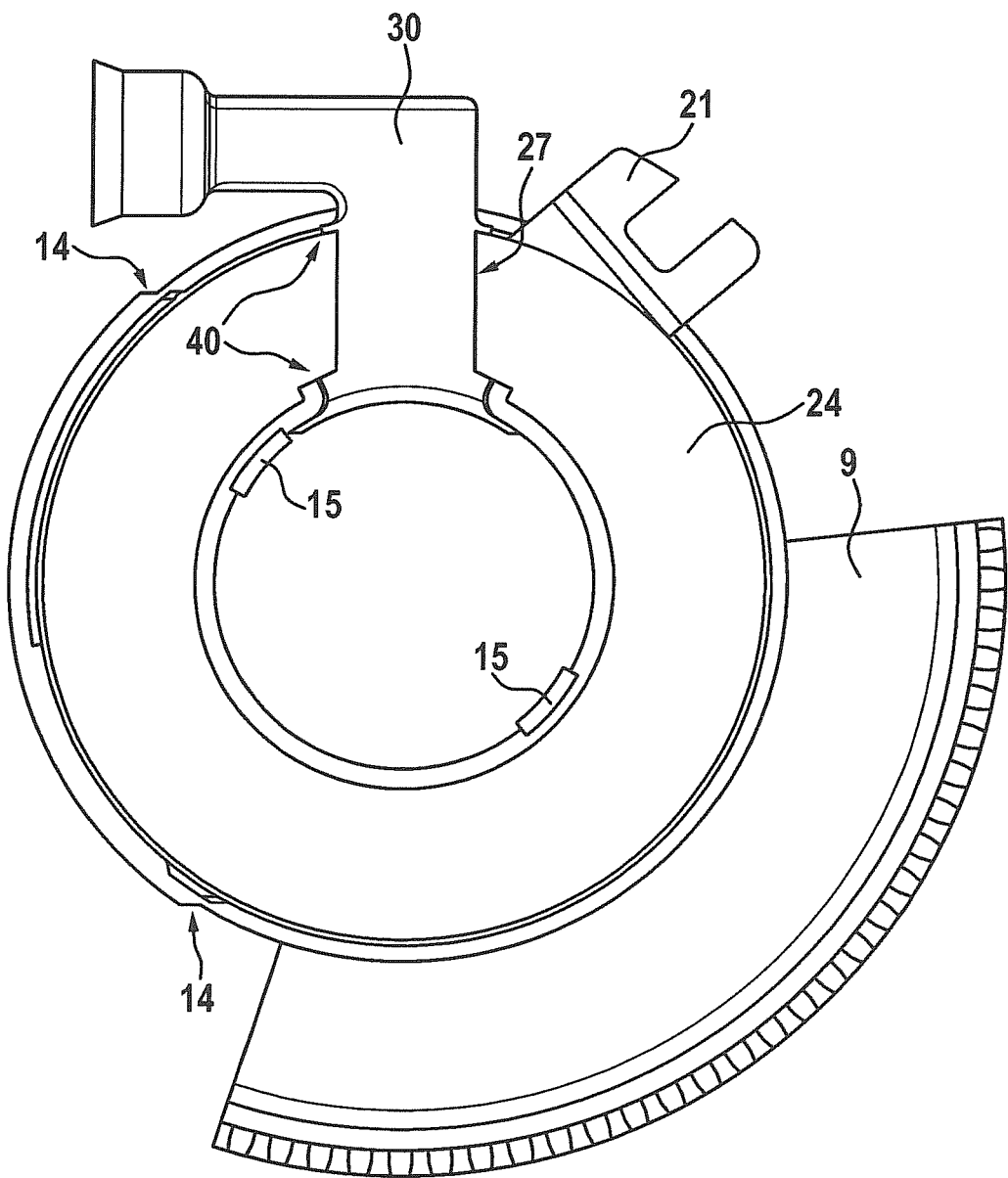
FIG. 12 shows a side view of the completely assembled unit of the controlled axial biasing unit in which the toothed segment is in operation.

FIG. 12 shows the completely assembled controlled axial biasing unit 1 in a side view. The only parts missing are the thrust needle roller bearings. The toothed segment 9 is in operation which means that the first ramp disk 11 has rotated relative to the second ramp disk 12. In the illustration shown in FIG. 12 it can be clearly seen how the oil flow guide 30 is installed. The oil flow guide 30 comprises a plurality of projections 40 that engage into corresponding shaped portions of the axial biasing unit 1 to thus guarantee a safety of the fixation of the oil flow guide 30. The oil flow guide 30 is inserted into the C-shaped spacer 24 and fits into the empty space 27 formed in the C-shaped spacer 24.

Figure 13:
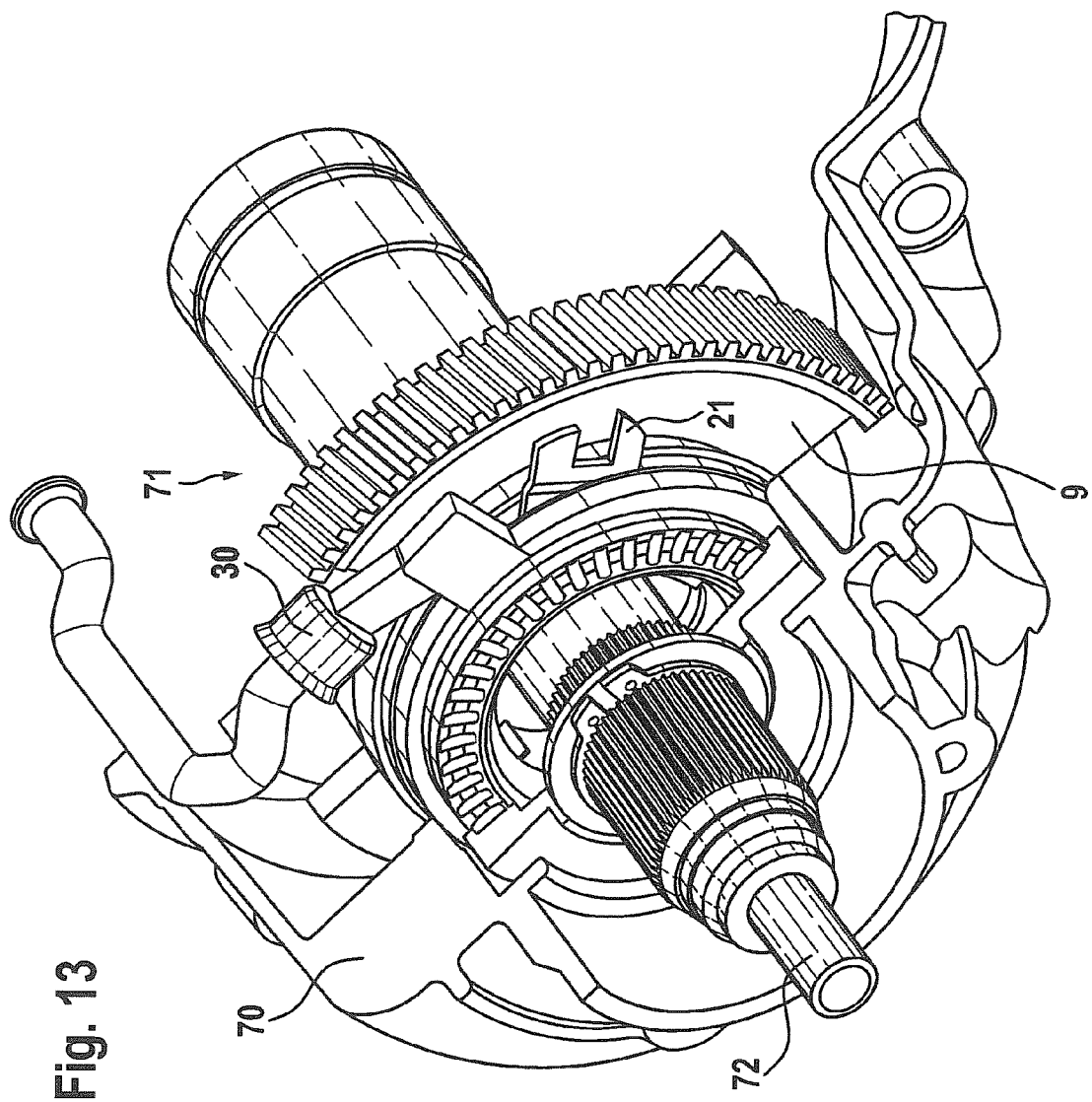
FIG. 13 shows a perspective view of the controlled axial biasing unit and the installation of the controlled axial biasing unit in a transmission.

FIG. 13 shows a perspective view of the installation of the axial biasing unit 1 in a transmission 71. The transmission 71 comprises a casing 70 to which the anti-rotation device 21 is connected in a suitable manner. The drive shaft 72 engages through the opening 31 configured in the axial biasing unit 1. This opening is configured in the cage 2, the first ramp disk 11, the second ramp disk 12, the spacer 22, the spacer 24, the thrust needle roller bearing 23 and the thrust needle roller bearing 25.

Figure 14:
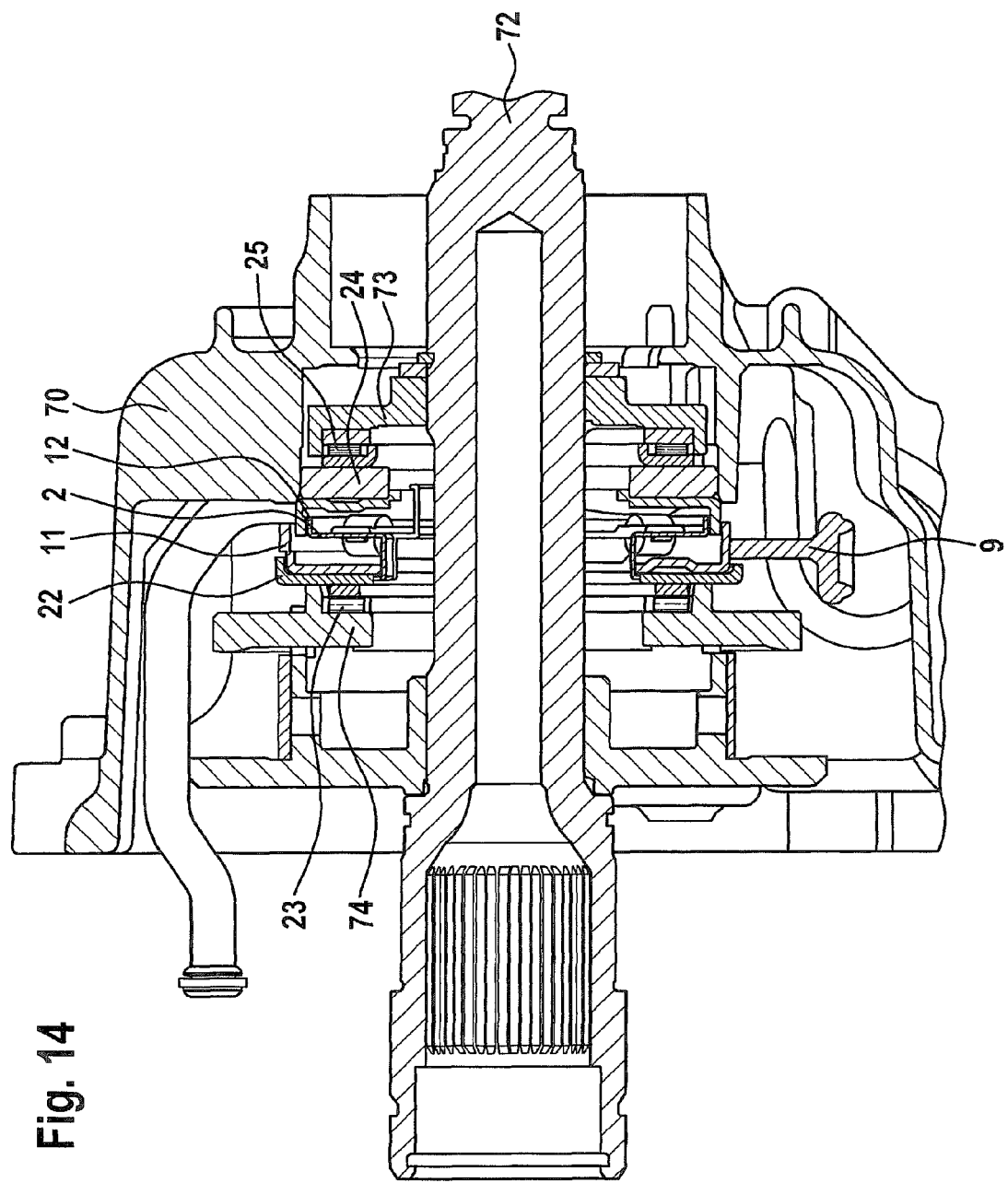
FIG. 14 shows a sectional view of the installation of the controlled axial biasing unit in the transmission.

FIG. 14 shows a side view of the axial biasing unit 1 installed in a transmission 71. The thrust needle roller bearing 25 bears against a support plate 73. Through an actuation of the toothed segment 9, the first ramp disk 11 can be made to rotate relative to the second ramp disk 12. During this rotation, the rolling elements 3, which are retained in the cage 2, ascend or descend along the ramp contours 8. Thus, through the actuation of the toothed segment, the axial distance between the first ramp disk 11 and second ramp disk 12 changes. As a result, the first ramp disk 11 acts through the spacer 22 and the thrust needle roller bearing 23 on a pressure plate 74. Finally, through the pressure plate 74, an element is actuated within the transmission 71.

The invention has been described with reference to one preferred form of embodiment. A person skilled in the art will at once understand that modifications to and deviations from the invention are possible without departing from the scope of protection claimed in the following claims.

The invention claimed is:

1. A controlled axial biasing unit comprising a first ramp disk and a second ramp disk, each of which is configured with a plurality of ramp contours, an annular cage carrying a plurality of rolling elements located between the first ramp disk and the second ramp disk, one of the two ramp disks comprising a toothed segment and the other of the two ramp disks comprising an anti-rotation device, wherein at least the first ramp disk, the second ramp disk and the cage are made by a shaping method without chip removal, through which shaping method each of the first ramp disk and the second ramp disk is configured with a continuous wall and through said shaping method, the first ramp disk and the second ramp disk comprise on an outer periphery ($U_A$) an integrally formed safety stop device for respective end positions, and the annular cage comprises pockets corresponding in number to a number of the rolling elements to be retained, and the annular cage comprises integrally formed retaining lugs on an inner diameter ($U_I$) which project perpendicularly from both sides of the annular cage.

2. The controlled axial biasing unit according to claim 1, wherein the ramp contour forms an angle smaller than or equal to 5°.

3. The controlled axial biasing unit according to claim 1, wherein the anti-rotation device is welded to the one of the two ramp disks to connect said disk to a casing.

4. The controlled axial biasing unit according to claim 3, wherein the other of the two ramp disks comprises the toothed segment that is shaped out of sheet metal and configured with a rolled-in gearing.

5. The controlled axial biasing unit according to claim 4, wherein the toothed segment is welded to the first ramp disk.

6. The controlled axial biasing unit according to claim 4, wherein the rolled-in gearing is a helical gearing.

7. The controlled axial biasing unit according to claim 4, wherein the first ramp disk comprises a spacer that is adjoined by a thrust needle roller bearing.

8. The controlled axial biasing unit according to claim 7, wherein the second ramp disk comprises a spacer that is adjoined by a thrust needle roller bearing.

9. A controlled axial biasing unit comprising a first ramp disk and a second ramp disk, each of which is configured with a plurality of ramp contours, an annular cage carrying a plurality of rolling elements located between the first ramp disk and the second ramp disk, one of the two ramp disks comprising a toothed segment and the other of the two ramp disks comprising an anti-rotation device, wherein at least the first ramp disk, the second ramp disk and the cage are made by a shaping method without chip removal, through which shaping method each of the first ramp disk and the second ramp disk is configured with a continuous wall and through said shaping method, the first ramp disk and the second ramp disk comprise on an outer periphery ($U_A$) an integrally formed safety stop device for respective end positions, wherein the anti-rotation device is welded to the one of the two ramp disks to connect said disk to a casing, the other of the two ramp disks comprises the toothed segment that is shaped out of sheet metal and configured with a rolled-in gearing, the first ramp disk comprises a spacer that is adjoined by a thrust needle roller bearing, the second ramp disk comprises a spacer that is adjoined by a thrust needle roller bearing, and the spacer that follows the second ramp disk has a C-shaped configuration, an oil flow guide is fitted into an empty space of the C-shaped configuration and a width of the oil flow guide corresponds to a width of the spacer.

10. The controlled axial biasing unit according to claim 9, wherein each of the first ramp disk and the second ramp disk has a pot-shaped configuration and comprises a central opening, a wall being formed integrally on the outer periphery ($U_A$) of each of the first ramp disk and the second ramp disk.

11. The controlled axial biasing unit according to claim 10, wherein the first ramp disk has a larger outer diameter ($D_A$) than the second ramp disk, so that the pot-shaped second ramp disk engages partially into the pot-shaped first ramp disk.

12. The controlled axial biasing unit according to claim 10, wherein retaining lugs of the cage engage an inner diameter ($D_I$) of the central opening of the first ramp disk and of the second ramp disk and thus retain the first ramp disk and the second ramp disk together.

13. The controlled axial biasing unit according to claim 12, wherein the cage that retains the first ramp disk and the second ramp disk together, the spacer that adjoins the first ramp disk, the spacer that adjoins the second ramp disk, together with the respective thrust needle roller bearings and in conjunction with the anti-rotation device, the toothed segment and the oil flow guide form a pre-assembled unit.

14. The controlled axial biasing unit according to claim 13, wherein the spacer associated to the first ramp disk has a pot-shaped configuration and has an outer diameter ($D_A$) through which the pre-assembled unit is guided in an installed state in the casing.

15. A controlled axial biasing unit comprising a first ramp disk and a second ramp disk, each of which is configured with a plurality of ramp contours, an annular cage carrying a plurality of rolling elements located between the first ramp disk and the second ramp disk, one of the two ramp disks comprising a toothed segment and the other of the two ramp disks comprising an anti-rotation device, wherein at least the first ramp disk, the second ramp disk and the cage are made by a shaping method without chip removal, through which shaping method each of the first ramp disk and the second ramp disk is configured with a continuous, axially extending outer wall such that the first ramp disk and the second ramp disk each have a pot-shaped configuration, the ramp contours are formed in the first and second ramp disks and include a hollow space in an area opposite an axially protruding surface of the ramp contours of each of the first and second ramp disks, and the first ramp disk and the second ramp disk comprise on an outer periphery ($U_A$) an integrally formed safety stop device for respective end positions.

* * * * *